US012679680B2

(12) United States Patent
Shimada et al.

(10) Patent No.: US 12,679,680 B2
(45) Date of Patent: Jul. 14, 2026

(54) MEDIUM TRANSPORT DEVICE AND RECORDING DEVICE

(71) Applicant: SEIKO EPSON CORPORATION, Tokyo (JP)

(72) Inventors: Chiaki Shimada, Okaya (JP); Toshikazu Kotaka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 211 days.

(21) Appl. No.: 18/333,694

(22) Filed: Jun. 13, 2023

(65) Prior Publication Data

US 2023/0399186 A1 Dec. 14, 2023

(30) Foreign Application Priority Data

Jun. 14, 2022 (JP) ................................ 2022-095873

(51) Int. Cl.
*B65H 5/02* (2006.01)
*B41J 29/17* (2006.01)

(52) U.S. Cl.
CPC .............. *B65H 5/021* (2013.01); *B41J 29/17* (2013.01); *B65H 2402/31* (2013.01); *B65H 2801/06* (2013.01)

(58) Field of Classification Search
CPC ....... B65H 2404/2693; B65H 2601/324; B41J 19/005; B41J 29/17
See application file for complete search history.

(56) References Cited

U.S. PATENT DOCUMENTS

| | | | | |
|---|---|---|---|---|
| 10,766,723 | B2 * | 9/2020 | Tsukijima | B65H 5/025 |
| 2014/0174888 | A1 | 6/2014 | Koshida | |
| 2016/0279970 | A1 * | 9/2016 | Nakata | B41J 13/025 |
| 2018/0236785 | A1 | 8/2018 | Sadakuni | |
| 2023/0382136 | A1 * | 11/2023 | Kosuge | B41J 11/007 |

FOREIGN PATENT DOCUMENTS

| | | | |
|---|---|---|---|
| JP | 2014-126587 | A | 7/2014 |
| JP | 2018-114619 | A | 7/2018 |
| JP | 2018-130919 | A | 8/2018 |

* cited by examiner

*Primary Examiner* — Howard J Sanders
(74) *Attorney, Agent, or Firm* — WORKMAN NYDEGGER

(57) ABSTRACT

A medium transport device includes a belt unit and a first support section and a second support section configured to pivotably support the belt unit, wherein the first support section includes a first frame and a second frame that is a flame configured to detach from and attach to the first frame, and configured to pivotably support the belt unit and a direction in the width direction from a the center of a transport belt toward the first support section is an outer direction, the second frame is positioned in the outer direction with respect to the first frame.

10 Claims, 15 Drawing Sheets

MEDIUM TRANSPORT DEVICE AND RECORDING DEVICE

The present application is based on, and claims priority from JP Application Serial Number 2022-095873, filed Jun. 14, 2022, the disclosure of which is hereby incorporated by reference herein in its entirety.

BACKGROUND

1. Technical Field

The present disclosure relates to a medium transport device that transports a medium and a recording device including the medium transport device.

2. Related Art

In a recording device represented by a printer, a configuration in which a medium represented by a recording sheet is transported using a transport belt may be adopted. In the recording device according to JP-A-2018-130919, a belt transport section, which is a unit including a transport belt, is provided so as to be capable of switching, by pivoting, between a first state in which recording is performed and a second state separated from a recording head. The belt transport section is pivotably provided with respect to the frame and pivoted by a link mechanism operated by a motor.

The life of the transport belt is shorter than that of other members, and the necessity of replacement is high. As shown in FIG. 7 of JP-A-2018-130919, in the related art, in order to replace the transport belt, it has been necessary to remove the belt transport section, which is a unit, from the frame. In addition, in order to replace the transport belt, it is necessary to release tension applied to the transport belt. In view of the above, it has been desired that the transport belt can be replaced more easily.

SUMMARY

In order to solve the above described problems, a medium transport device of the present disclosure includes a belt unit that is a unit including a transport belt for transporting a medium and that is pivotably supported on both sides in a width direction, which is a direction intersecting a medium transport direction; a first support section disposed on one side of the belt unit in the width direction and configured to pivotably support the belt unit; and a second support section disposed on the other side of the belt unit in the width direction and configured to pivotably support the belt unit, wherein the first support section includes a first frame and a second frame, the second frame being configured to detach from and attach to the first frame and being configured to pivotably support the belt unit, as viewed from a rotation axis direction of the belt unit, the second frame overlaps with a part of the transport belt, and a direction in the width direction from the center of the transport belt toward the first support section is an outer direction, the second frame is positioned in the outer direction with respect to the first frame.

A medium transport device according to the present disclosure includes a belt unit that is a unit including a transport belt for transporting a medium and that is pivotably supported on both sides in a width direction, which is a direction intersecting a medium transport direction; a first support section disposed on one side of the belt unit in the width direction and configured to pivotably support the belt unit; and a second support section disposed on the other side of the belt unit in the width direction and configured to pivotably support the belt unit, wherein the belt unit includes a first roller around which the transport belt is wound, a second roller around which the transport belt is wound, a first member engaged with the first roller, a second member that engages with the second roller and that is displaceable with respect to the first member in a direction in which an inter-axis distance between the first roller and the second roller changes, a pressing member that presses the second member in a direction in which the inter-axis distance increases, a third member that receives pressing force of the pressing member and that is displaceable in a displacement direction of the second member, and a fourth member that is a detachable and attachable member and that fixes position of the third member in the displacement direction and by removing the fourth member, the pressing force with which the pressing member presses the second member is weakened.

And a recording device according to the present disclosure includes a recording section configured to perform recording on a medium and any one of the above medium transport devices.

DESCRIPTION OF EMBODIMENTS

Figure 1:
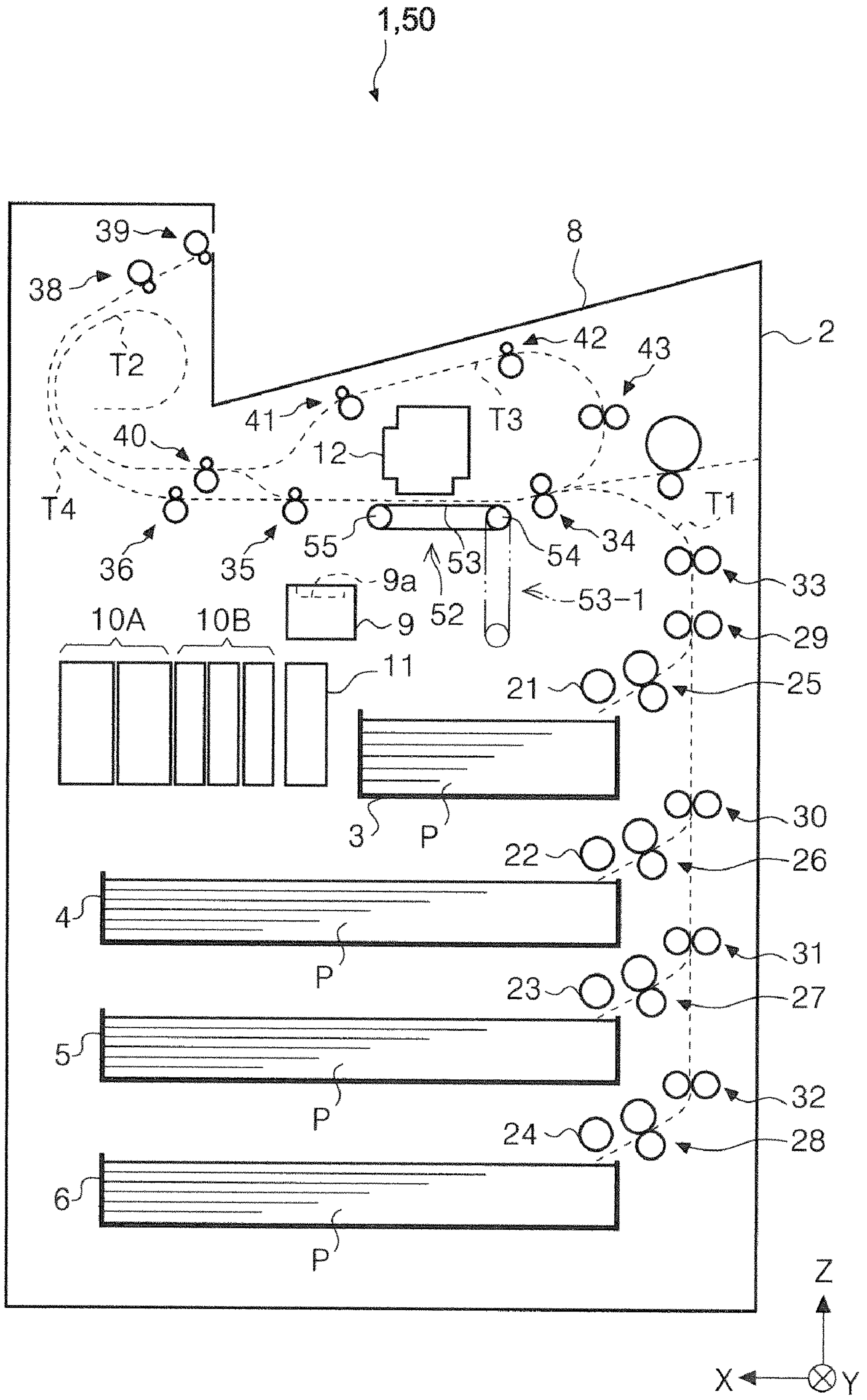
FIG. 1 is a diagram showing an entire medium transport path in a printer.

The present disclosure is generally described below.

A medium transport device according to a first aspect includes a belt unit that is a unit including a transport belt for transporting a medium and that is pivotably supported on both sides in a width direction, which is a direction intersecting a medium transport direction; a first support section disposed on one side of the belt unit in the width direction and configured to pivotably support the belt unit; and a second support section disposed on the other side of the belt unit in the width direction and configured to pivotably support the belt unit, wherein the first support section includes a first frame and a second frame, the second frame being configured to detach from and attach to the first frame and being configured to pivotably support the belt unit, as viewed from a rotation axis direction of the belt unit, the second frame overlaps with a part of the transport belt, and the second frame is positioned in an outer direction with respect to the first frame, wherein a direction in the width direction from the center of the transport belt toward the first support section is the outer direction.

According to this aspect, since the first support section includes the first frame and the second frame, the second frame is detachable from and attachable to the first frame and pivotably supports the belt unit, and the second frame is located outward from the first frame, the one end side of the transport belt in the width direction can be exposed by detaching the second frame. Accordingly, the transport belt can be removed in a state in which the belt unit is supported by the second support section, that is, the transport belt can be removed without removing the belt unit from both the first support section and the second support section, and thus the transport belt can be more easily replaced.

A second aspect is an aspect according to the first aspect, further includes a first link mechanism provided on the first support section side in the width direction with respect to the belt unit; a second link mechanism provided on the second support section side in the width direction with respect to the belt unit; and a transmission shaft that transmits power to the first link mechanism and the second link mechanism, wherein it has a configuration in which rotation of the transmission shaft is converted into pivoting of the belt unit via the first link mechanism and the second link mechanism and in a state where the connection between the first link mechanism and the belt unit is released, posture of the belt unit is maintained by the second link mechanism.

According to this aspect, since the posture of the belt unit is maintained by the second link mechanism in a state in which the connection between the first link mechanism and the belt unit is released, the posture of the belt unit when the transport belt is replaced becomes stable, and workability when the transport belt is replaced improves.

A third aspect is an aspect according to the second aspect, wherein the belt unit includes a first roller around which the transport belt is wound, a second roller around which the transport belt is wound, a first member engaged with the first roller, a second member that engages with the second roller and that is displaceable with respect to the first member in a direction in which an inter-axis distance between the first roller and the second roller changes, a pressing member that presses the second member in a direction in which the inter-axis distance increases, a third member that receives pressing force of the pressing member and that is displaceable in a displacement direction of the second member, and a fourth member that is a detachable and attachable member and that fixes position of the third member in the displacement direction and by removing the fourth member, the pressing force with which the pressing member presses the second member is weakened.

When the transport belt is replaced, if strong tension is applied to the transport belt, it is difficult to replace the transport belt. However, according to this aspect, since the pressing force for pressing the second member by the pressing member is weakened by removing the fourth member, workability when replacing the transport belt is improved. Note that “the pressing force is weakened” includes the meaning that the pressing force becomes zero.

This aspect is not limited to the first aspect, and may be applied to the second aspect.

A fourth aspect is an aspect according to the third aspect, wherein the belt unit detachably and attachably includes a cleaning unit configured to clean the transport belt by contact with the transport belt and the fourth member is integrally provided with the cleaning unit.

According to this aspect, the belt unit is detachably provided with the cleaning unit that cleans the transport belt by coming into contact with the transport belt, and the fourth member is provided integrally with the cleaning unit. Therefore, when the cleaning unit is removed in order to remove the transport belt, the fourth member is also removed, and the pressing force is weakened. This further improves the workability when the transport belt is replaced.

A fifth aspect is an aspect according to the fourth aspect, wherein at least one of the third member and the fourth member is provided with a guide surface that guides the third member in a direction in which the third member advances toward the second member as the fourth member is attached.

According to this aspect, at least one of the third member and the fourth member is provided with a guide surface that guides the third member in a direction in which the third member advances toward the second member in accordance with the attachment of the fourth member. Therefore, the third member is automatically displaced in accordance with the attachment of the fourth member, and the workability in attaching the fourth member is improved.

This aspect is not limited to the fourth aspect, and may be applied to the third aspect.

A sixth aspect is an aspect according to the third aspect, wherein the second support section is provided with a drive source for driving the first roller.

According to this aspect, since the second support section is provided with the drive source that drives the first roller, it is necessary to release the connection between the first roller and the drive source in order to remove the belt unit from the second support section. However, because the belt unit may remain supported by the second support section when the transport belt is replaced, it is possible to avoid that the drive source becomes an obstacle to the replacement work of the transport belt.

This aspect is not limited to the third aspect, and may be applied to either of the fourth and fifth aspects.

A medium transport device according to a seventh aspect includes a belt unit that is a unit including a transport belt for transporting a medium and that is pivotably supported on both sides in a width direction, which is a direction intersecting a medium transport direction; a first support section disposed on one side of the belt unit in the width direction and configured to pivotably support the belt unit; and a second support section disposed on the other side of the belt unit in the width direction and configured to pivotably support the belt unit, wherein the belt unit includes a first roller around which the transport belt is wound, a second roller around which the transport belt is wound, a first member engaged with the first roller, a second member that engages with the second roller and that is displaceable with respect to the first member in a direction in which an inter-axis distance between the first roller and the second roller changes, a pressing member that presses the second member in a direction in which the inter-axis distance increases, a third member that receives pressing force of the pressing member and that is displaceable in a displacement direction of the second member, and a fourth member that is a detachable and attachable member and that fixes position of the third member in the displacement direction and by removing the fourth member, the pressing force with which the pressing member presses the second member is weakened.

When the transport belt is replaced, if strong tension is applied to the transport belt, it is difficult to replace the transport belt. However, according to the aspect, since the pressing force for pressing the second member is weakened by removing the fourth member without removing the pressing member, workability when replacing the transport belt is improved. Note that "the pressing force is weakened" includes the meaning that the pressing force becomes zero.

An eighth aspect is an aspect according to the seventh aspect, wherein the belt unit detachably and attachably includes a cleaning unit configured to clean the transport belt by contact with the transport belt and the fourth member is integrally provided with the cleaning unit.

According to this aspect, the belt unit is detachably provided with the cleaning unit that cleans the transport belt by coming into contact with the transport belt, and the fourth member is provided integrally with the cleaning unit. Therefore, when the cleaning unit is removed in order to remove the transport belt, the fourth member is also removed, and the pressing force is weakened. This further improves the workability when the transport belt is replaced.

A ninth aspect includes a recording section configured to perform recording on a medium and the medium transport device according to any one of the first to eighth aspects.

According to this aspect, the operations and effects of any of the first to eighth aspects described above can be obtained in the recording device.

Hereinafter, the present disclosure will be specifically described.

Hereinafter, an inkjet printer 1 that performs recording by ejecting ink, which is an example of a liquid, onto a recording sheet, which is an example of a medium, will be described as an example of a recording device. Hereinafter, the inkjet printer 1 will be referred to simply as a printer 1.

The inkjet printer 1 can also be regarded as a medium transport device 50 from the viewpoint of transporting a medium. From the viewpoint of the medium transport device 50, the medium transport device 50 may or may not include a line head 12 (to be described later).

An X-Y-Z coordinate system illustrated in the drawings is an orthogonal coordinate system, and a Y-axis direction is a width direction intersecting a transport direction of a medium and is an apparatus depth direction. In this embodiment, among side surfaces constituting the periphery of the device main body 2, the side surface in the +Y direction is the back surface, and the side surface in the −Y direction is the front surface.

An X-axis direction is an apparatus width direction and, as viewed from an operator of the printer 1, a +X direction is to the left side and a −X direction is to the right side. The −X direction is the recording sheet feeding direction from each sheet cassette (to be described later).

The Z axis direction is a vertical direction, that is, an apparatus height direction, and a +Z direction is an upward direction and a −Z direction is a downward direction.

Hereinafter, the direction in which the recording sheet is fed may be referred "downstream", and the opposite direction may be referred "upstream". In FIG. 1, a sheet transport path is indicated by a dashed line. The recording sheet in the printer 1 is transported through a sheet transport path indicated by a dashed line.

The printer 1 includes a plurality of sheet cassettes along a vertical direction at a lower portion of the device main body 2, having the line head 12 (to be described later), specifically, a first sheet cassette 3, a second sheet cassette 4, a third sheet cassette 5, and a fourth sheet cassette 6. Reference symbol P indicates recording sheets accommodated in each sheet cassette.

Each of the sheet cassettes is provided with a pickup roller that feeds the accommodated recording sheets in the −X direction. Reference symbols 21, 22, 23, and 24 indicate the pickup rollers provided for each of the sheet cassettes.

Each of the sheet cassettes is provided with a feed roller pair that feeds the recording sheet fed by the pickup roller further downstream. Reference symbols 25, 26, 27, and 28 indicate the feed roller pair provided for each of the sheet cassettes.

Unless otherwise specified, a "roller pair" in the following description includes a driving roller driven by a motor (not shown) and a driven roller driven to rotate by contact with the driving roller.

Reference symbol T1 indicates a transport path of the recording sheets that are fed out from each of the sheet cassettes and reach a transport roller pair 34. A recording sheet fed from the first sheet cassette 3 is transported to the transport roller pair 34 by receiving a transporting force from transport roller pairs 29 and 33. A recording sheet fed from the second sheet cassette 4 is transported to the transport roller pair 34 by receiving the transporting force from a transport roller pair 30 and the transport roller pairs 29 and 33. A recording sheet fed from the third sheet cassette 5 is transported to the transport roller pair 34 by receiving the transporting force from a transport roller pair 31 and the transport roller pairs 30, 29, and 33. A recording sheet fed out from the fourth sheet cassette 6 is transported to the transport roller pair 34 by receiving the transporting force from a transport roller pair 32 and the transport roller pairs 31, 30, 29, and 33.

A recording sheet receiving the transporting force from the transport roller pair 34 is transported to a position between the line head 12, which is an example of a recording section and of a liquid ejection head, and a transport belt 53, that is, to a recording position facing the line head 12.

The line head 12 performs recording by ejecting ink, which is an example of liquid, onto a surface of the recording sheet. The line head 12 is an ink ejection head configured such that nozzles that discharge ink cover the entire area in the recording sheet width direction, and is configured as the ink ejection head capable of performing recording on the entire area in the recording sheet width direction without moving in the recording sheet width direction. However, the ink ejection head is not limited thereto, and may be a type that is mounted on a carriage and that ejects ink while moving in the recording sheet width direction.

Figure 2:
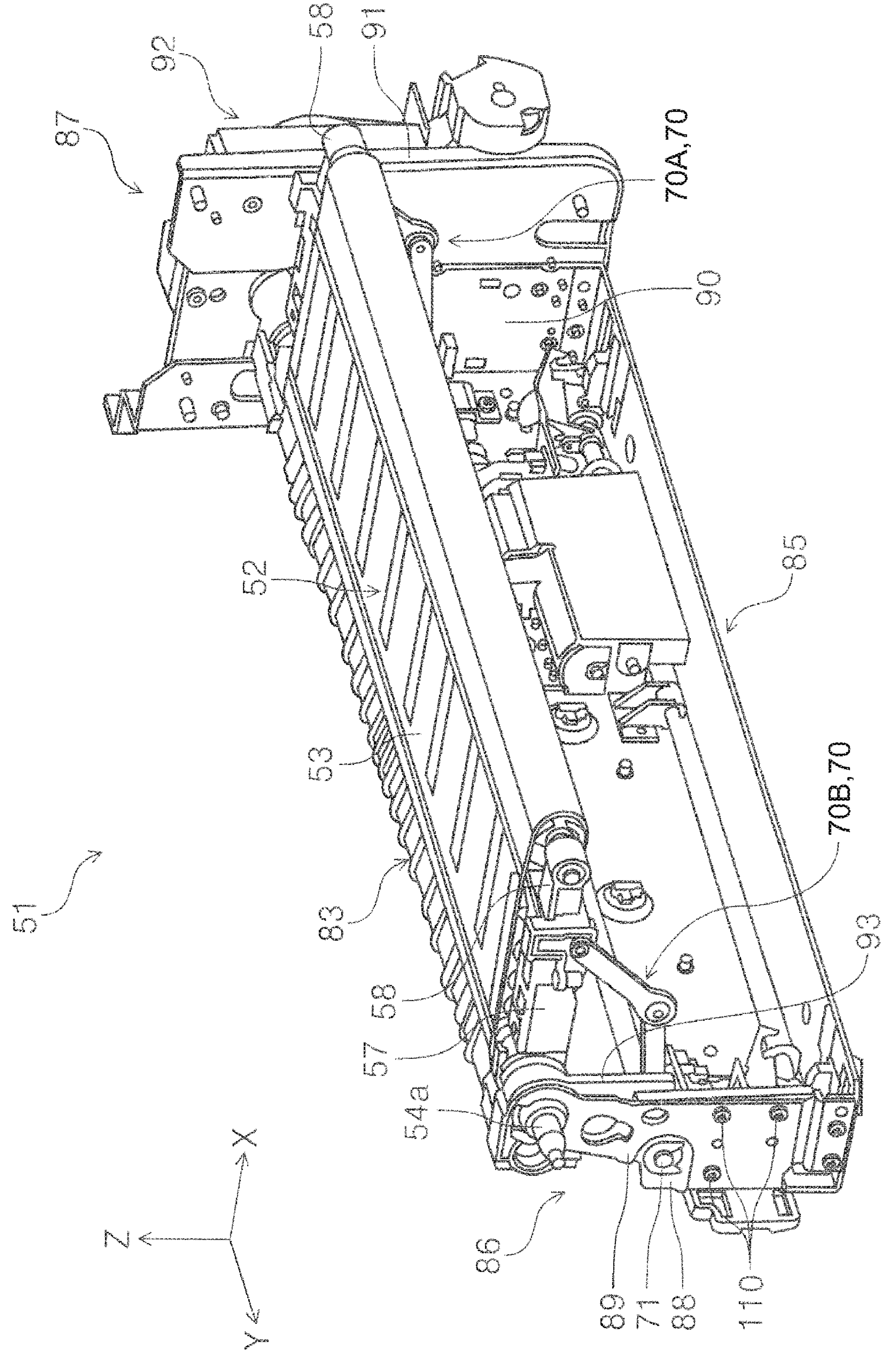
FIG. 2 is a perspective view of a transport unit in a state where a belt unit is in a second posture.
Figure 3:
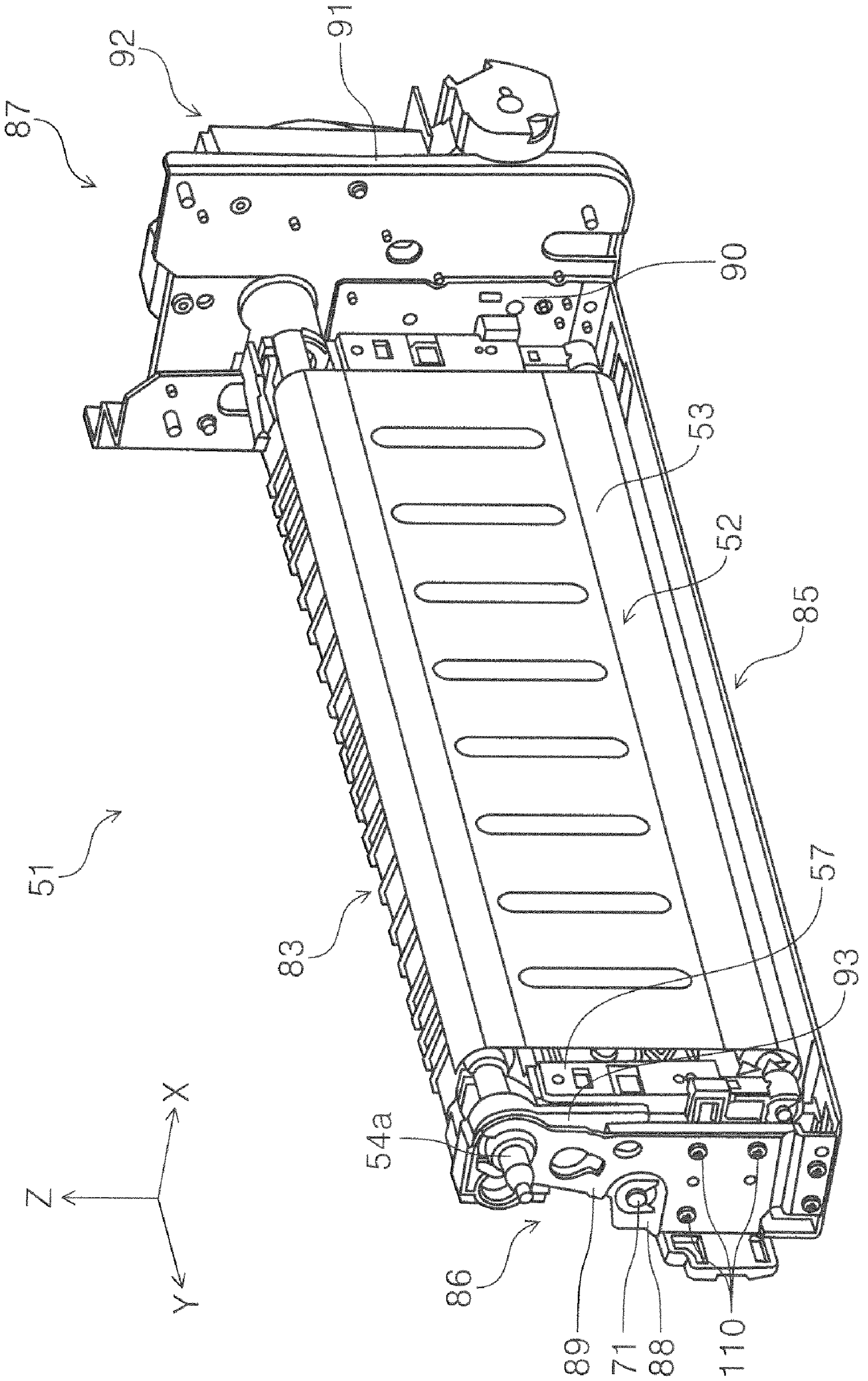
FIG. 3 is a perspective view of the transport unit in a state where the belt unit is in a first posture.

The transport belt 53 is an endless belt wound around a first roller 54 and a second roller 55, and rotates when the first roller 54 is driven by a drive unit 92 (see FIGS. 2 and 3). The recording sheet is transported to a position facing the line head 12 while being attracted to the belt surface of the transport belt 53. In the present embodiment, an electrostatic attraction method is employed to attract the recording sheet to the transport belt 53. The technique for charging the transport belt 53 will be described later.

The recording sheet on which recording has been performed on a first surface by the line head 12 is transported toward one of transport roller pair 36 and transport roller pair 40 by transport roller pair 35 positioned downstream of the transport belt 53. A path switching flap (not shown) is provided on the downstream side of the transport roller pair 35, and the recording sheet receiving the transporting force from the transport roller pair 35 is transported to either the transport roller pair 36 or the transport roller pair 40 by this path switching flap.

When recording is not performed on both the first surface and a second surface opposite to the first surface of the recording sheet, that is, when double-sided recording is not performed, the recording sheet is transported from the transport roller pair 35 toward the transport roller pair 36, and is discharged toward a discharge tray 8 through a discharge path T4. The discharge path T4 is provided with a transport roller pair 38 and a transport roller pair 39.

When recording is performed on both the first surface and the second surface opposite to the first surface of the recording sheet, that is, when double-sided recording is performed, the recording sheet is transported from the transport roller pair 35 toward the transport roller pair 40 and enters a switchback path T2. Thereafter, the rotation direction of the transport roller pair 40 is switched, and the recording sheet enters an inversion path T3 and is transported to the transport roller pair 34 by transport roller pairs 41, 42, and 43.

Reference symbols 10A and 10B indicate ink containers as a liquid containing section that contains ink before ejection. The ink ejected from the line head 12 is supplied to the line head 12 from the ink containers 10A and 10B through a tube (not shown).

Reference symbol 9 indicates a cap unit having a cap section 9*a* for capping the line head 12. The cap unit 9 is provided so as to be displaceable between a cap position (not shown) at which the cap section 9*a* caps the line head 12 and a separation position (position shown in FIG. 1) at which the cap section 9*a* separates from the line head 12. As will be described in detail later, when the cap unit 9 moves to the cap position, the transport belt 53 retreats from the position facing the line head 12 as indicated by two dot chain line and reference symbol 53-1.

Reference symbol 11 indicates a waste liquid container that stores ink as waste liquid ejected from the line head 12 toward the cap section 9*a* for maintenance. Ink as waste liquid ejected from the line head 12 toward the cap section 9*a* for maintenance is sent from the cap section 9*a* to the waste liquid container 11 via a tube (not shown).

Next, a transport unit 51 including the transport belt 53 will be described with reference to FIG. 2 and subsequent drawings.

The transport unit 51 includes a belt unit 52 including the transport belt 53 that attracts and transports the recording sheet. The belt unit 52 is a unit pivotably supported on both sides in the Y-axis direction, that is, in a width direction.

The transport unit 51 includes a first support section 86 that is a support section disposed in the +Y direction, which is one side of the belt unit 52 in the Y-axis direction, and that pivotably supports the belt unit 52, and a second support section 87 that is a support section disposed in the −Y direction, which is the other side of the belt unit 52 in the Y-axis direction, and that pivotably supports the belt unit 52.

The belt unit 52 is pivotably provided by the rotation shaft 54*a* of the first roller 54 being supported by the first support section 86 and the second support section 87.

The first support section 86 includes a first frame 88, a second frame 89, and a support member 93. The second support section 87 includes a third frame 90, a fourth frame 91, and a drive unit 92.

Figure 8:
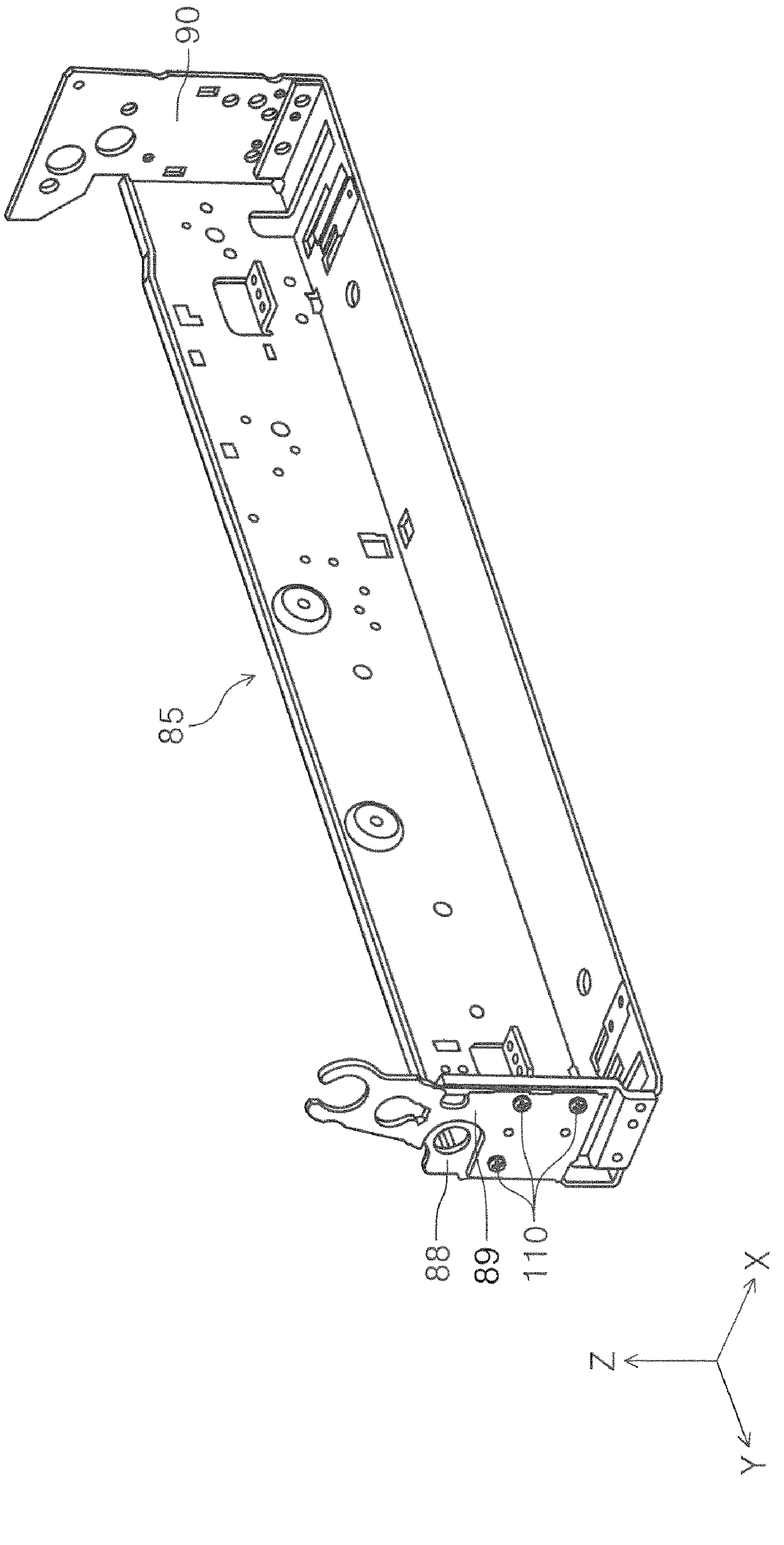
FIG. 8 is a perspective view of a frame unit.

A base body of the transport unit 51 is composed of a frame unit 85. As shown in FIG. 8, the frame unit 85 has the first frame 88 and the second frame 89 at an end section in the +Y direction, and the third frame 90 at an end section in the −Y direction.

As shown in FIGS. 2 and 3, the fourth frame 91 is attached to the third frame 90, and the drive unit 92 is attached with respect to the fourth frame 91, whereby the second support section 87 is constituted. The drive unit 92 is a unit including a motor (not shown), and transmits power to the rotation shaft 54*a* of the first roller 54 to pivot the transport belt 53. An end section of the rotation shaft 54*a* in the −Y direction is supported by the drive unit 92.

A motor (not shown) for rotating a transmission shaft 71 (to be described later) is attached to the fourth frame 91.

An end section of the rotation shaft 54*a* in the +Y direction is supported by the second frame 89 via the support member 93. The second frame 89 is fixed to the first frame 88 by screws 110. In this embodiment, the rotation shaft 54*a* is indirectly supported by the second frame 89 via the support member 93, but may be directly supported by the second frame 89.

Figure 12:
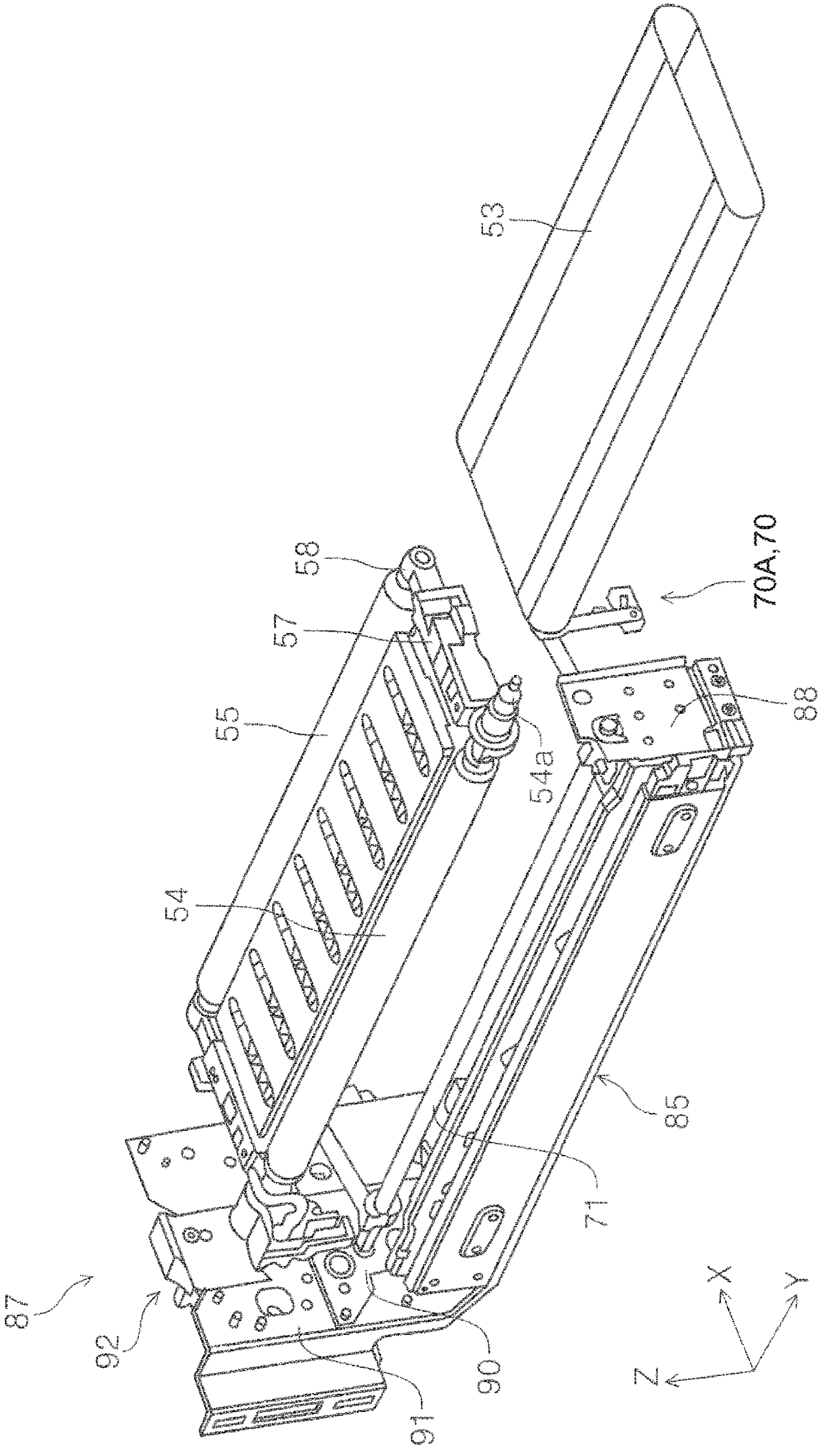
FIG. 12 is a perspective view of the transport unit in a state where the transport belt is removed.
Figure 13:
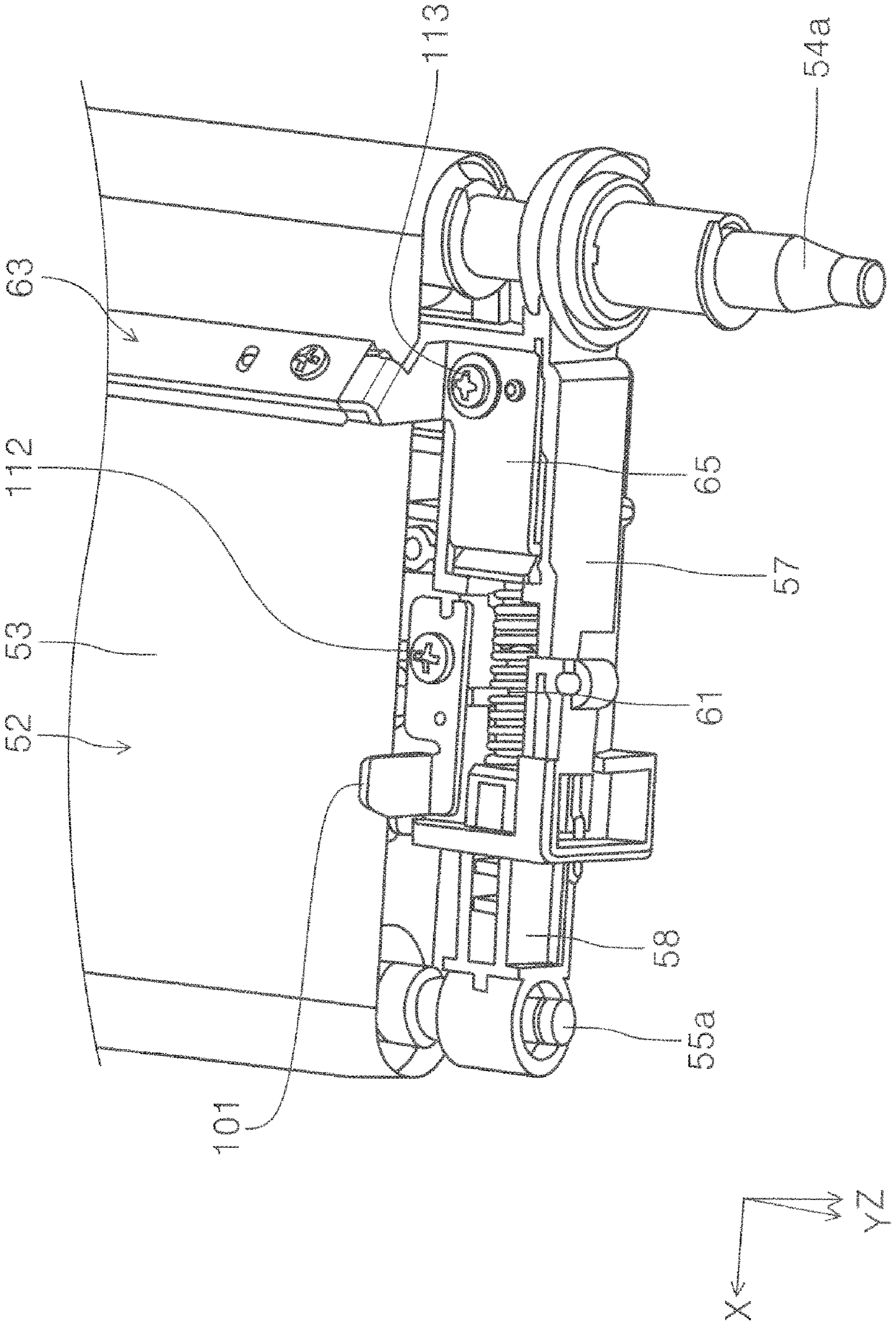
FIG. 13 is a partial enlarged perspective view of the belt unit.
Figure 14:
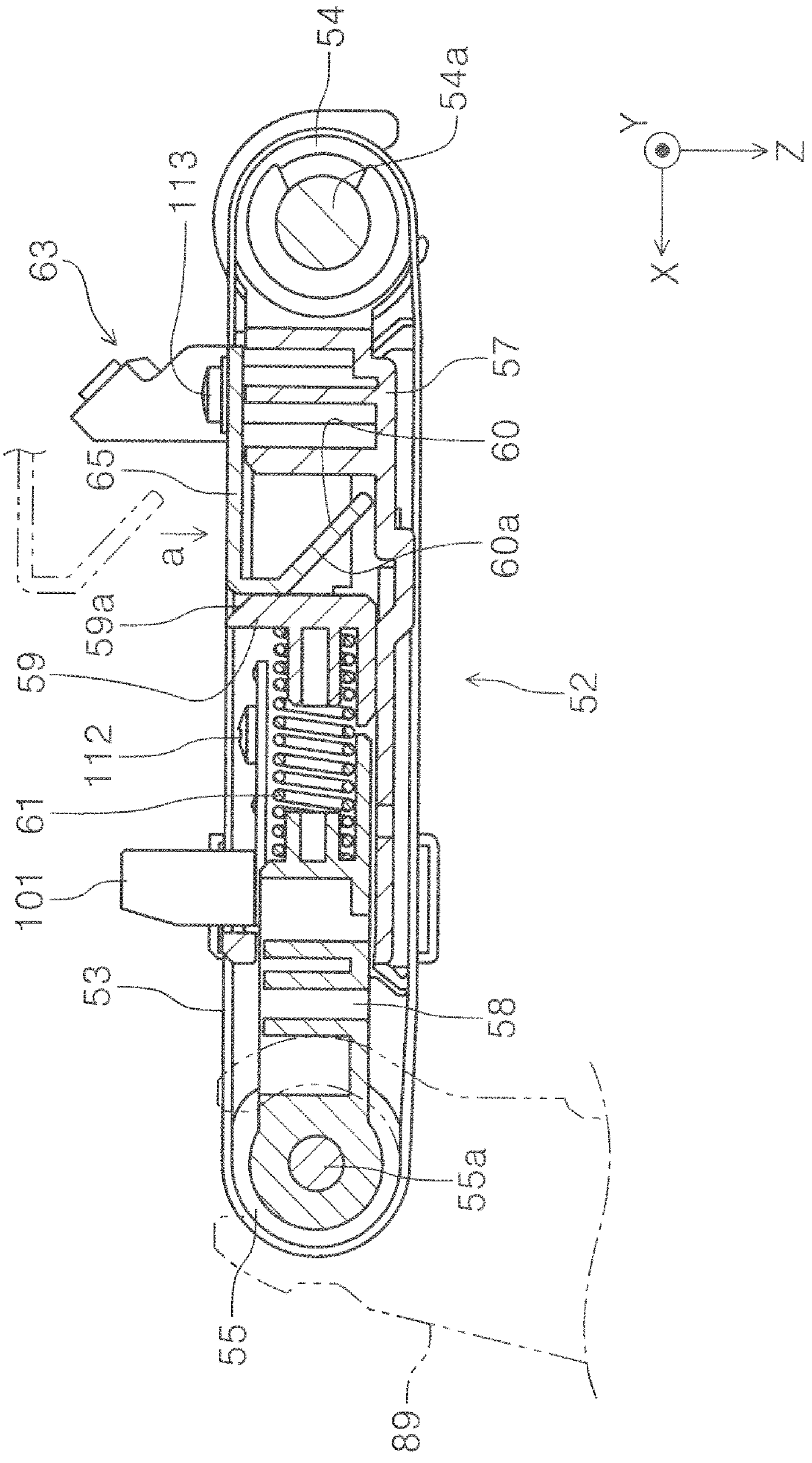
FIG. 14 is a cross-sectional view of the belt unit.

Next, the configuration of the belt unit 52 will be described. As shown in FIGS. 12, 13, and 14, the belt unit 52 includes the first roller 54 and the second roller 55 around which the transport belt 53 is wound, a first member 57 engaged with the first roller 54, and a second member 58 engaged with the second roller 55 and displaceable with respect to the first member 57 in a direction in which an inter-axis distance between the first roller 54 and the second roller 55 changes. The belt unit 52 is provided with coil springs 61, which is a pressing member for pressing the second member 58 in the direction in which the inter-axis distance increases, a third member 59, which receives a pressing force of the coil springs 61 and which can be displaced in a displacement direction of the second member 58, and a fourth member 60, which is a detachable and attachable member and which fixes the position of the third member 59 in the displacement direction.

The first member 57 is a member that constitutes a base body of the belt unit 52, is a member that maintains the overall shape of the transport belt 53 wound around the first roller 54 and the second roller 55, and is provided so as to be pivotable around the rotation shaft 54*a* of the first roller 54. The second member 58 supports the rotation shaft 55*a* of the second roller 55 and is provided slidably with respect to the first member 57, and the sliding direction is the direction in which the second roller 55 advances and retreats with respect to the first roller 54. That is, the direction in which the second member 58 separates from the first member 57 is the direction in which the inter-axis distance between the first roller 54 and the second roller 55 increases and the direction in which tension of the transport belt 53 increases. Further, the direction in which the second member 58 approaches the first member 57 is the direction in which the inter-axis distance between the first roller 54 and the second roller 55 is shortened and is a direction in which tension of the transport belt 53 is weakened.

The third member 59 functions as a spring receiving member, and the further the third member 59 is separated from the first roller 54, the more that spring length of the coil springs 61 shortens and the more that tension of the transport belt 53 increases. The position of the third member 59 is restricted by the fourth member 60.

The fourth member 60 is integrally provided with a fixed member 65 constituting a blade unit 63. The fixed member 65 is fixed to the first member 57 by a screw 113. Note that the fixed member 65 and the screw 113 are provided at the end section in the +Y direction as shown in FIG. 13 and, although not shown, also at the end section in the −Y direction.

Figure 5A:
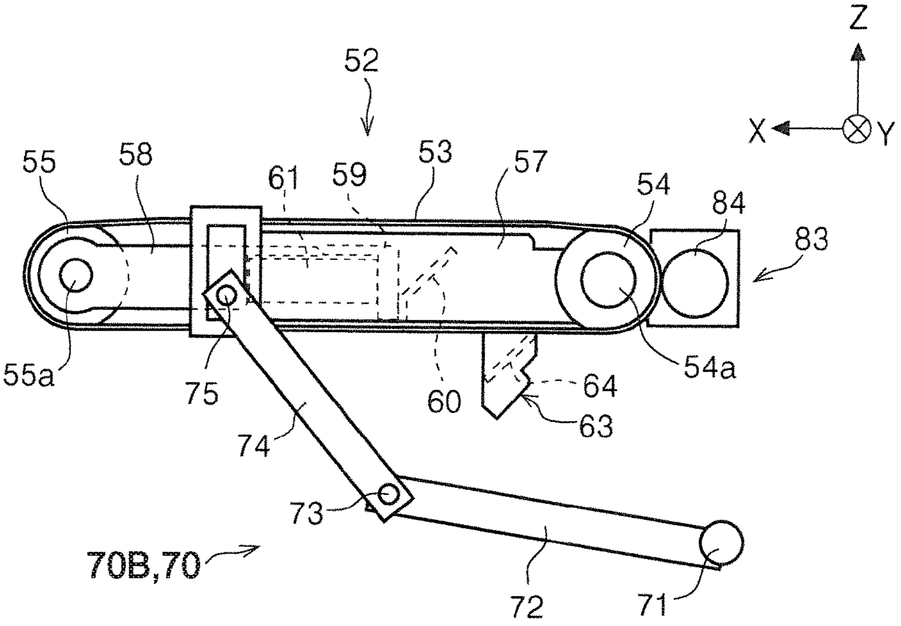
FIG. 5A is a side view of the transport unit in which the belt unit is in the second posture.
Figure 5B:
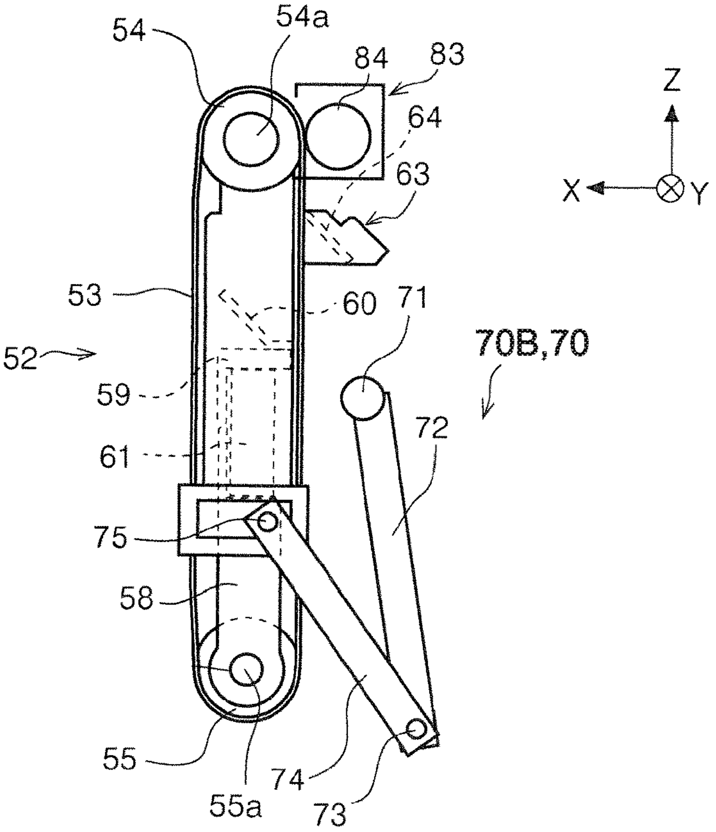
FIG. 5B is a side view of the transport unit in which the belt unit is in the first posture.
Figure 15:
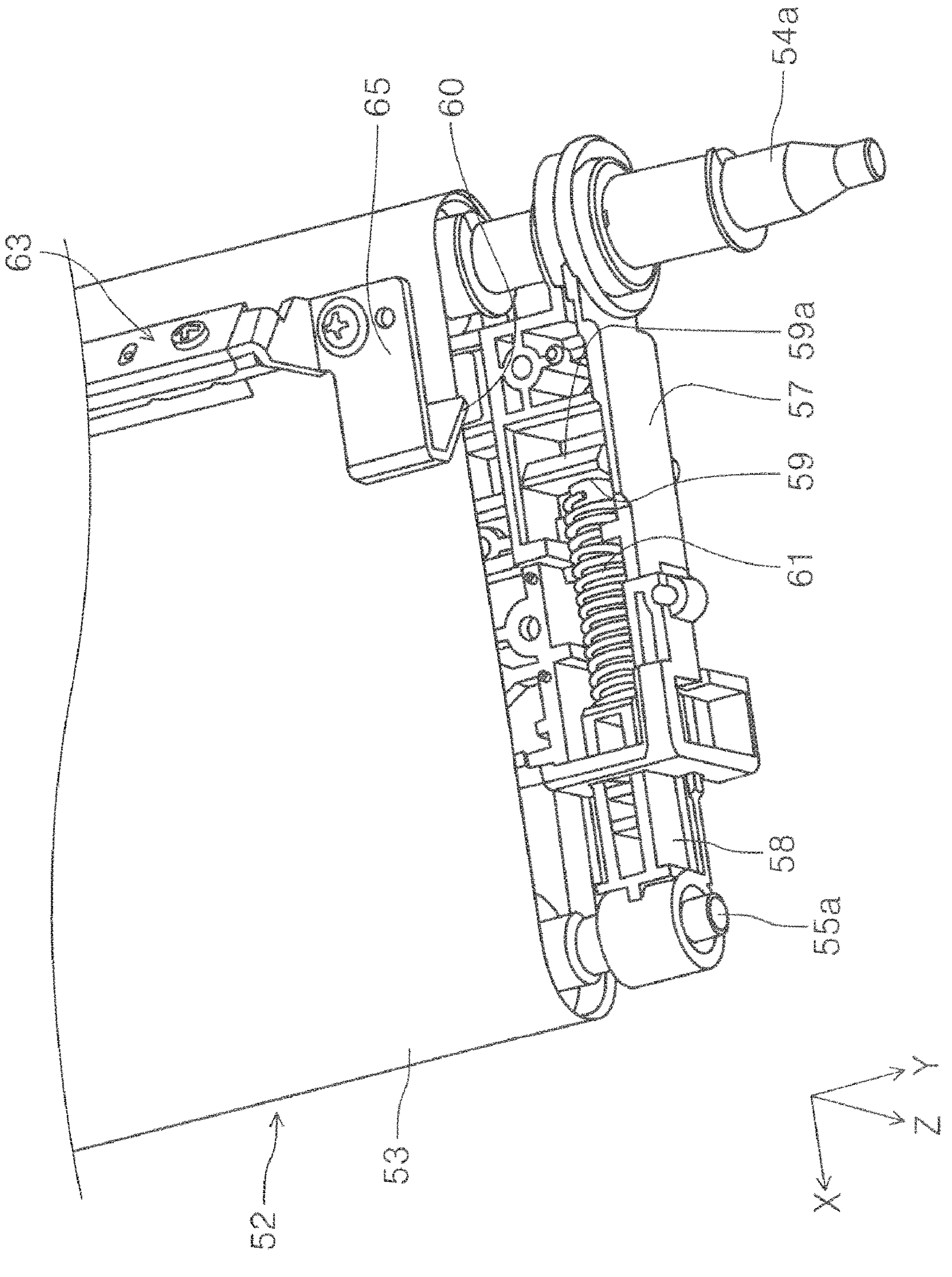
FIG. 15 is an exploded perspective view of the belt unit.

The blade unit 63 is an example of a cleaning unit and includes a blade 64 as shown in FIGS. 5A and 5B. The blade 64 is in contact with an outer surface of the transport belt 53 and functions to remove foreign matter adhering to the outer surface of the transport belt 53. When the screw 113 is removed from the first member 57, the fixation of the fixed member 65 to the first member 57 is released, and as shown in FIG. 15, the blade unit 63 can be removed from the first member 57, that is, from the belt unit 52.

When the blade unit 63 is removed from the first member 57, that is, the belt unit 52, the position restriction of the third member 59 by the fourth member 60 is eliminated. As a result, the spring length of the coil springs 61 increases and the tension of the transport belt 53 weakens.

Figure 4:
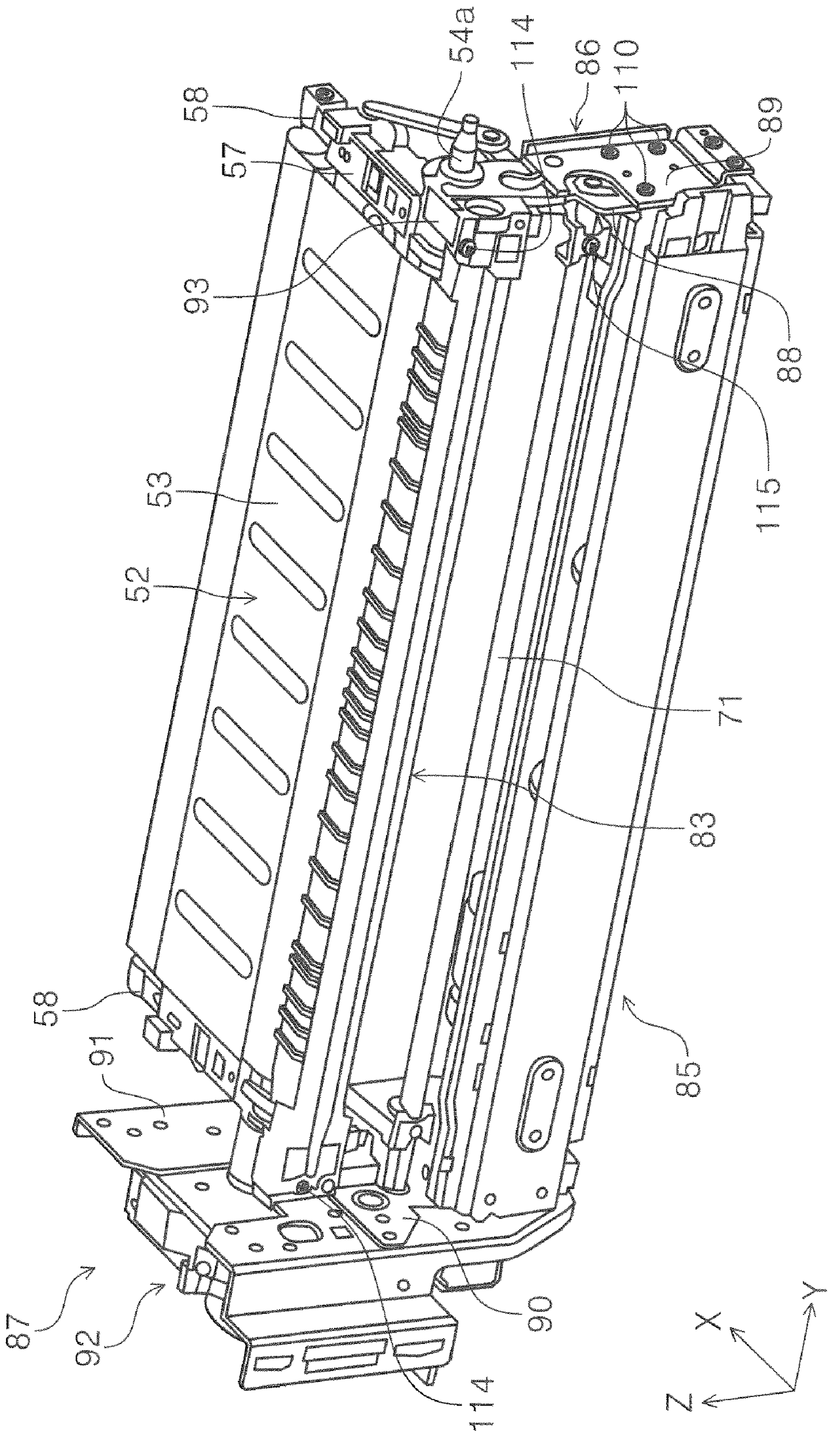
FIG. 4 is a perspective view of the transport unit in a state in which the belt unit is in a second posture.

As shown in FIGS. 4, 5A, and 5B, the belt unit 52 includes a charging unit 83. The charging unit 83 includes a charging roller 84. The charging roller 84 is a roller in contact with the outer surface of the transport belt 53 and is driven to rotate in accordance with the rotation of the transport belt 53. A DC voltage is applied to the charging roller 84 by a power supply device (not shown), whereby the charging roller 84 supplies an electric charge to a portion in contact with the transport belt 53. As a result, the outer surface of the transport belt 53 is charged to a positive polarity, and the outer surface of the transport belt 53 becomes an attraction surface that attracts the recording sheet.

Figure 6:
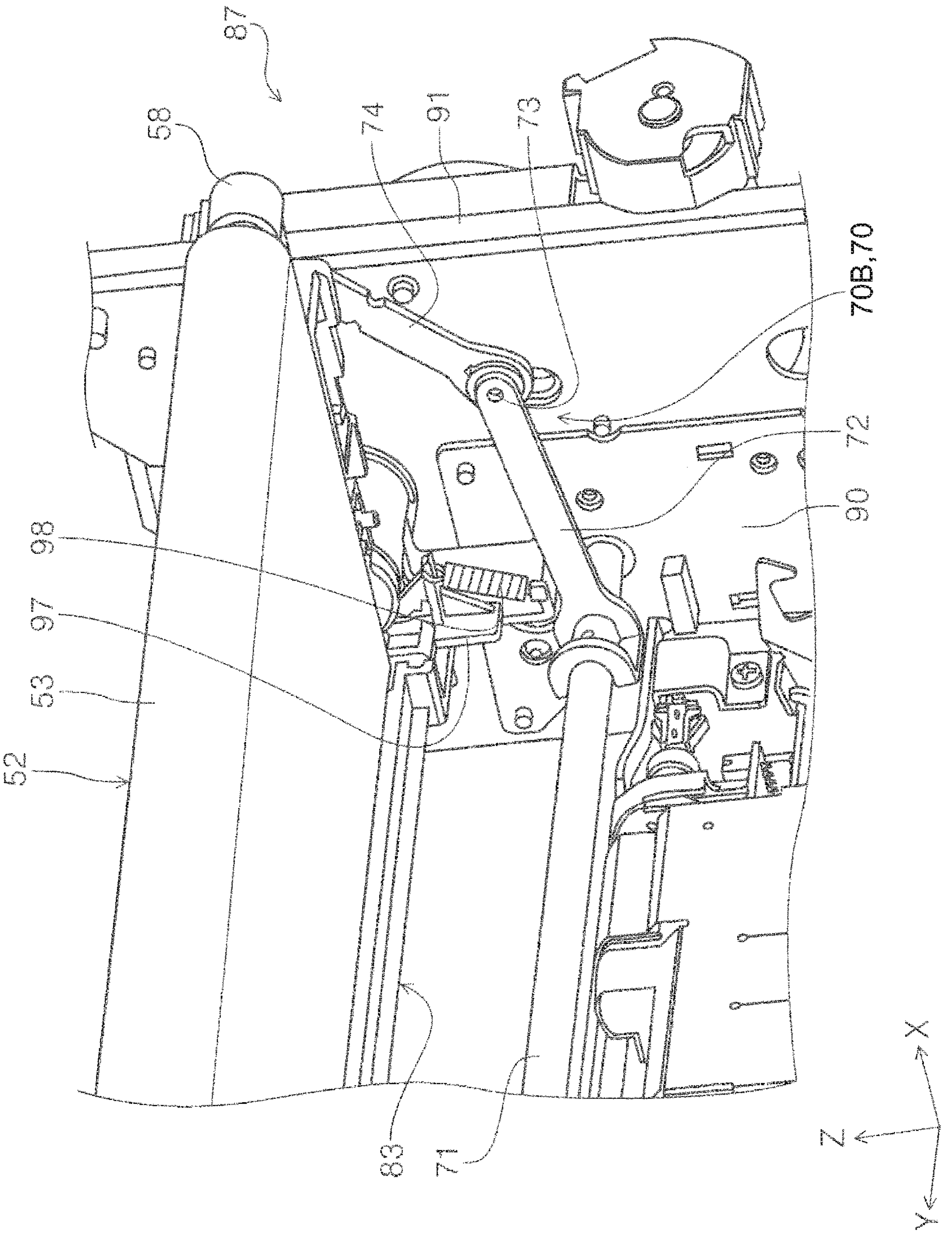
FIG. 6 is a perspective view of a second link mechanism.
Figure 7:
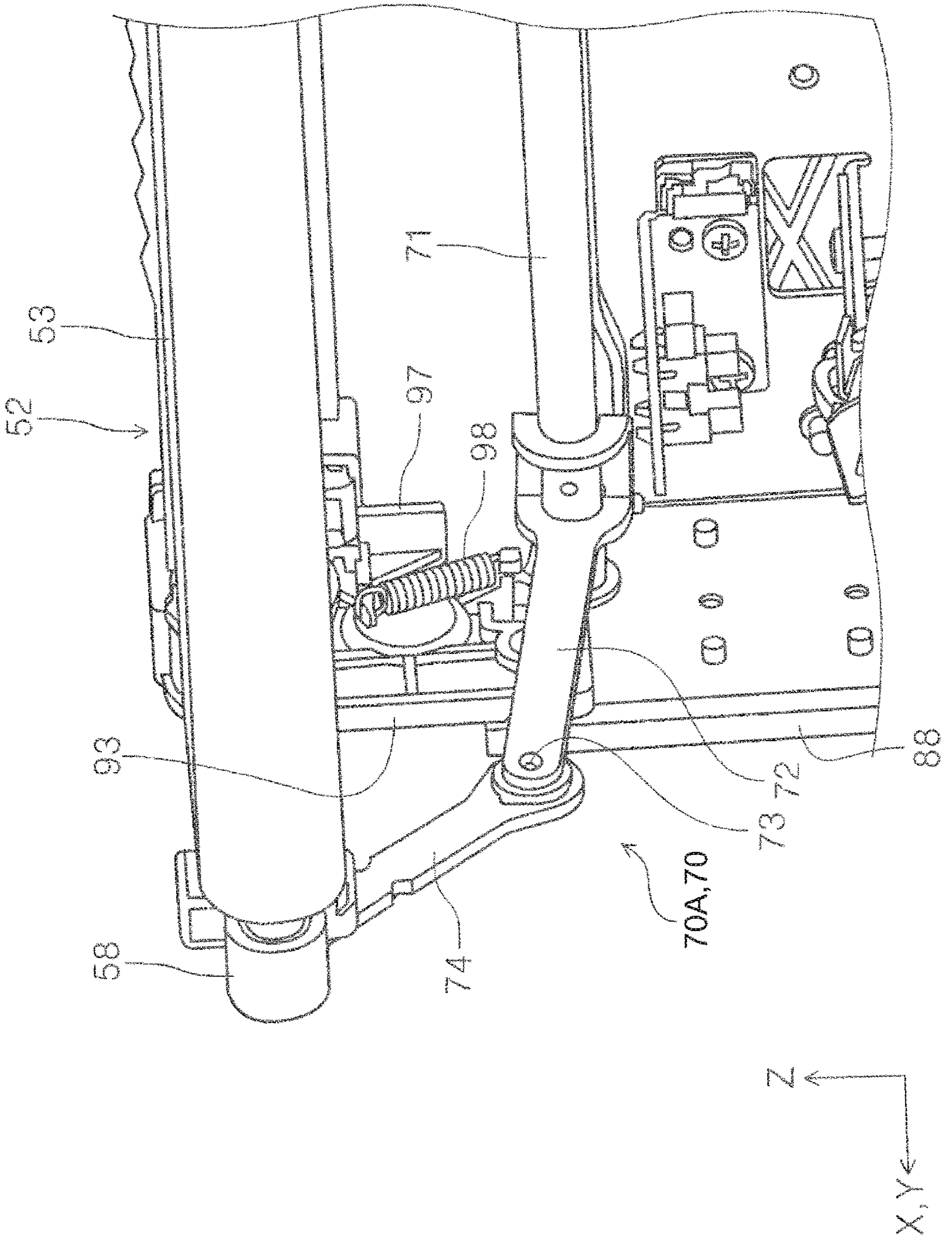
FIG. 7 is a perspective view of a first link mechanism.

In FIGS. 6 and 7, reference symbol 97 indicates a pressing member for pressing the charging roller 84 against the transport belt 53, a pressing spring 98 is hung on the pressing member 97, and the pressing member 97 presses the charging roller 84 against the transport belt 53 by the spring force of the pressing spring 98.

As shown in FIG. 4, the charging unit 83 is fixed to the support member 93 by a screw 114 at an end section in the +Y direction, and is fixed to the drive unit 92 by a screw 114 at an end section in the −Y direction.

The belt unit 52 having the above described configuration is pivotably supported by the first support section 86 and the second support section 87 as described above. Then, the belt unit 52 is pivoted by the link mechanism 70 to switch between a second posture shown in FIGS. 2 and 5A and a first posture shown in FIGS. 3 and 5B.

The second posture of the belt unit 52 is the posture when a recording sheet is transported and the posture when the transport belt 53 is replaced. The first posture of the belt unit 52 is the posture when the cap section 9*a* of the cap unit 9 caps the line head 12, as in the case of the transport belt shown by reference symbol 53-1 in FIG. 1.

The link mechanism 70 includes a first link mechanism 70A (see FIG. 7) provided in the +Y direction in the width direction, that is, the Y-axis direction, and a second link mechanism 70B (see FIG. 6) provided in the −Y direction.

Figure 9:
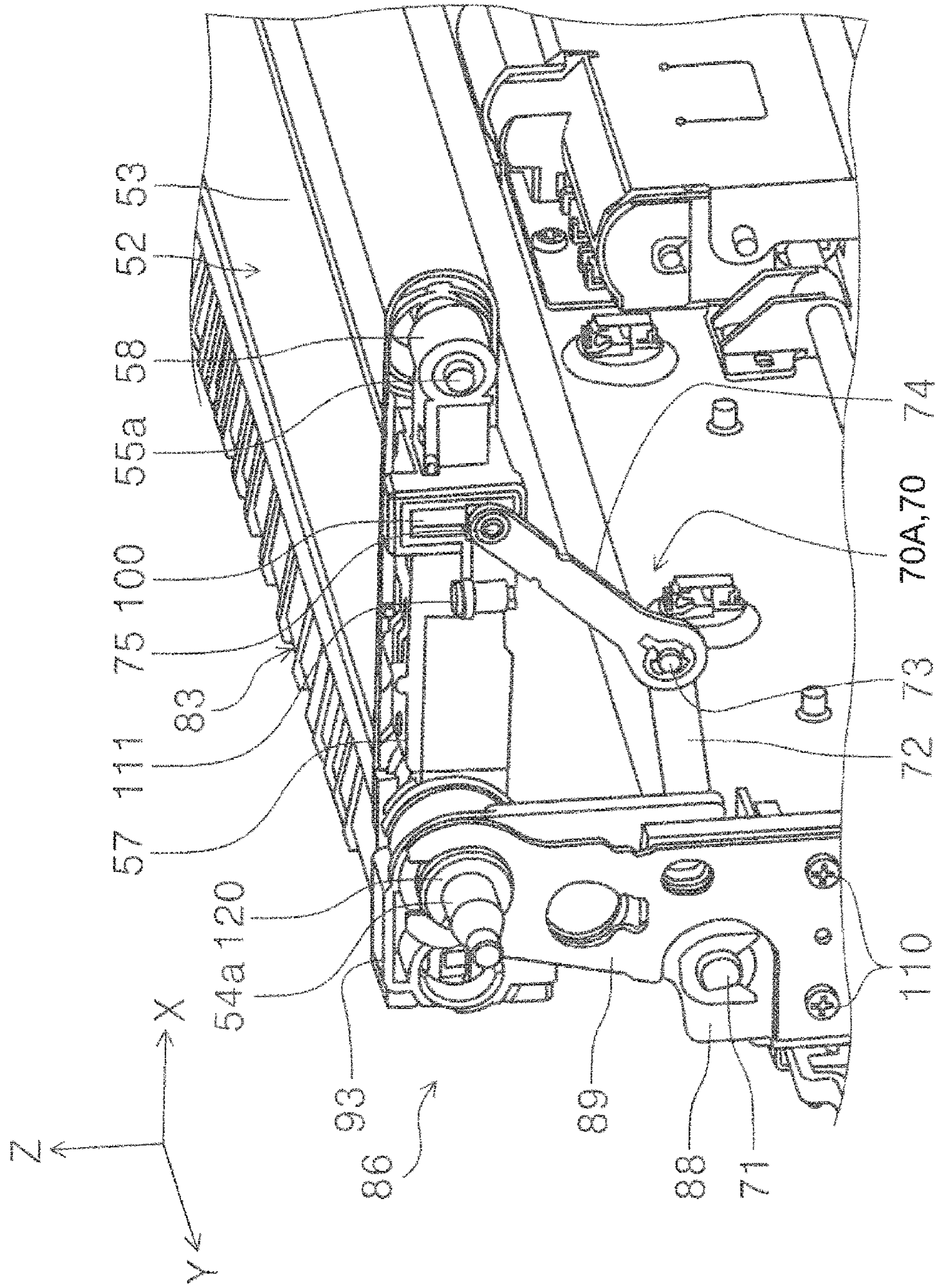
FIG. 9 is a perspective view of a first support section.

The first link mechanism 70A and the second link mechanism 70B have the same basic configuration, and each includes a first link rod 72 and a second link rod 74 as shown in FIGS. 6 and 7. The first link rod 72 is coupled to the transmission shaft 71 and rotates with the rotation of the transmission shaft 71. The first link rod 72 and the second link rod 74 are rotatably coupled to each other via a first coupling shaft 73, and as shown in FIG. 9 the second link rod 74 is coupled to a fixed member 100 via a second coupling shaft 75. The fixed member 100 is fixed to the first member 57 by a screw 111.

As shown in FIG. 4, the transmission shaft 71 extends along the Y-axis direction, is rotatably supported by the frame unit 85, and rotates by receiving power of a motor (not shown). When the transmission shaft 71 rotates, the link mechanism 70 operates, and the belt unit 52 pivots. That is, the rotation of the transmission shaft 71 causes the belt unit 52 to switch between the first posture and the second posture.

In the transport unit 51 having the above described configuration, the transport belt 53 has a shorter life than other members and the necessity to replace it is great. However, with a configuration that needs the entire belt unit 52 to be detached from the first support section 86 and the second support section 87 in order to replace the transport belt 53, workability is poor and working time is long, so the transport unit 51 according to the present embodiment includes a distinctive configuration described below.

Hereinafter, the above described distinctive configuration will be described while describing a procedure for replacing the transport belt 53.

It is necessary to pull the transport belt 53 off the belt unit 52 along the Y-axis direction. At that time, the parts which become obstacles are removed one by one. It is assumed that the transport unit 51 is detached from the printer 1 prior to the first procedure described below.

First, as a first procedure, the two screws 114 shown in FIG. 4 are removed, and the charging unit 83 is removed. As a result, contact between the charging roller 84 (see FIGS. 5A and 5B) and the transport belt 53 is eliminated.

Next, as a second procedure, the screw 113 at the end section in the +Y direction shown in FIG. 13 and the screw 113 (not shown) at the end section in the −Y direction are removed, and the fixed member 65, that is, the blade unit 63, is removed. As a result, tension of the transport belt 53 weakens as described above.

In the case of a configuration in which the tension of the transport belt 53 does not change according to attachment and detachment of the blade unit 63, for example, in the case where the fourth member 60 shown in FIG. 14 is a member independent of the blade unit 63, then the coil springs 61 are removed separately from the removal of the blade unit 63, and tension of the transport belt 53 weakens. In this case, both of the coil springs 61 provided at the end section in the +Y direction and the end section in the −Y direction are removed.

Next, as a third procedure, the screw 112 shown in FIG. 13 is removed, and a flag member 101 is removed. The flag member 101 configures a detection unit for detecting the posture of the belt unit 52, and a control section (not shown) of the printer 1 can determine whether or not the belt unit 52 is in the first posture by the flag member 101 entering a detection unit (not shown). As illustrated in FIG. 14, the flag member 101 overlaps the transport belt 53 as viewed from the Y-axis direction, and becomes an obstacle when the transport belt 53 is removed, and for this reason the flag member 101 is removed.

Next, as a fourth procedure, the pressing spring 98 shown in FIG. 7 is removed from the support member 93. This is because the pressing spring 98 is hung between the support member 93 and the pressing member 97 and becomes an obstacle when the support member 93 is rotated in the direction of arrow Ra in FIG. 10. The rotation of the support member 93 in the direction of the arrow Ra will be described later.

Note that a pressing spring 98 is also provided in the −Y direction as shown in FIG. 6, but it is not necessary to remove this pressing spring 98.

Next, as a fifth procedure, coupling of the first link mechanism 70A to the first member 57 and to the transmission shaft 71 is released. Specifically, the screw 111 (see FIG. 9) for fixing the fixed member 100 to the first member 57 is removed, and the fixed member 100 is removed from the first member 57. Further, the screw 114 (see FIG. 11) for fixing the first link rod 72 to the transmission shaft 71 is removed.

This operation is performed only for the first link mechanism 70A. That is, the second link mechanism 70B is left as it is without being touched.

Next, as a sixth procedure, the screws 110 fixing the second frame 89 to the first frame 88 are removed, and the second frame 89 is removed from the first frame 88. As illustrated in FIG. 14, the second frame 89 constituting the first support section 86 overlaps the transport belt 53 as viewed from the rotation axis direction of the belt unit 52, that is, the Y-axis direction, and becomes an obstacle when the transport belt 53 is pulled out in the +Y direction, and for this reason is removed.

Figure 10:
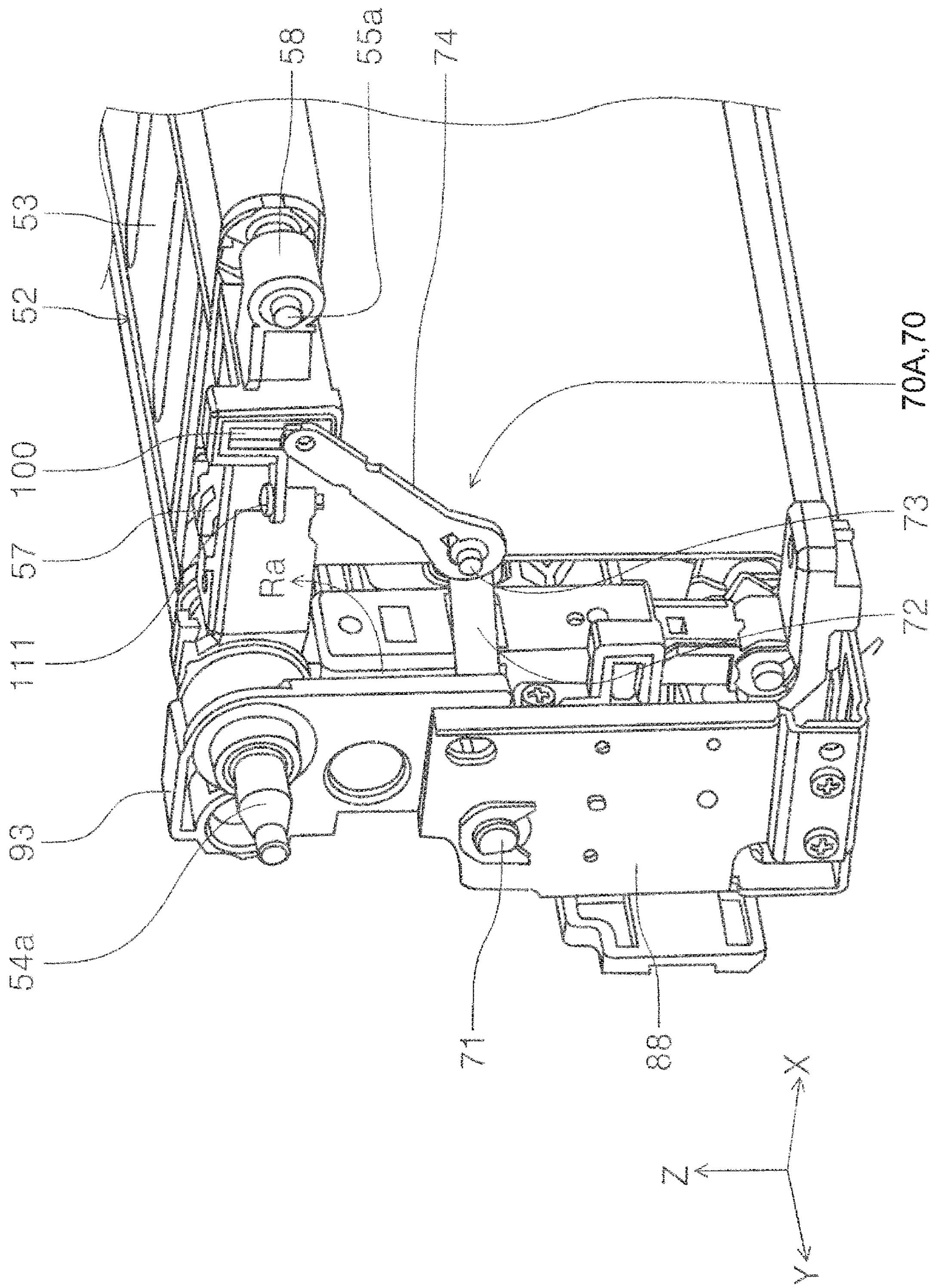
FIG. 10 is a perspective view of the first support section in a state where the second frame removed.

FIG. 10 shows a state in which the second frame 89 is detached from the first frame 88.

Next, as a seventh procedure, an E-ring 120 (see FIG. 9), which performs the function of preventing the support member 93 from coming off in the +Y direction, is removed.

Figure 11:
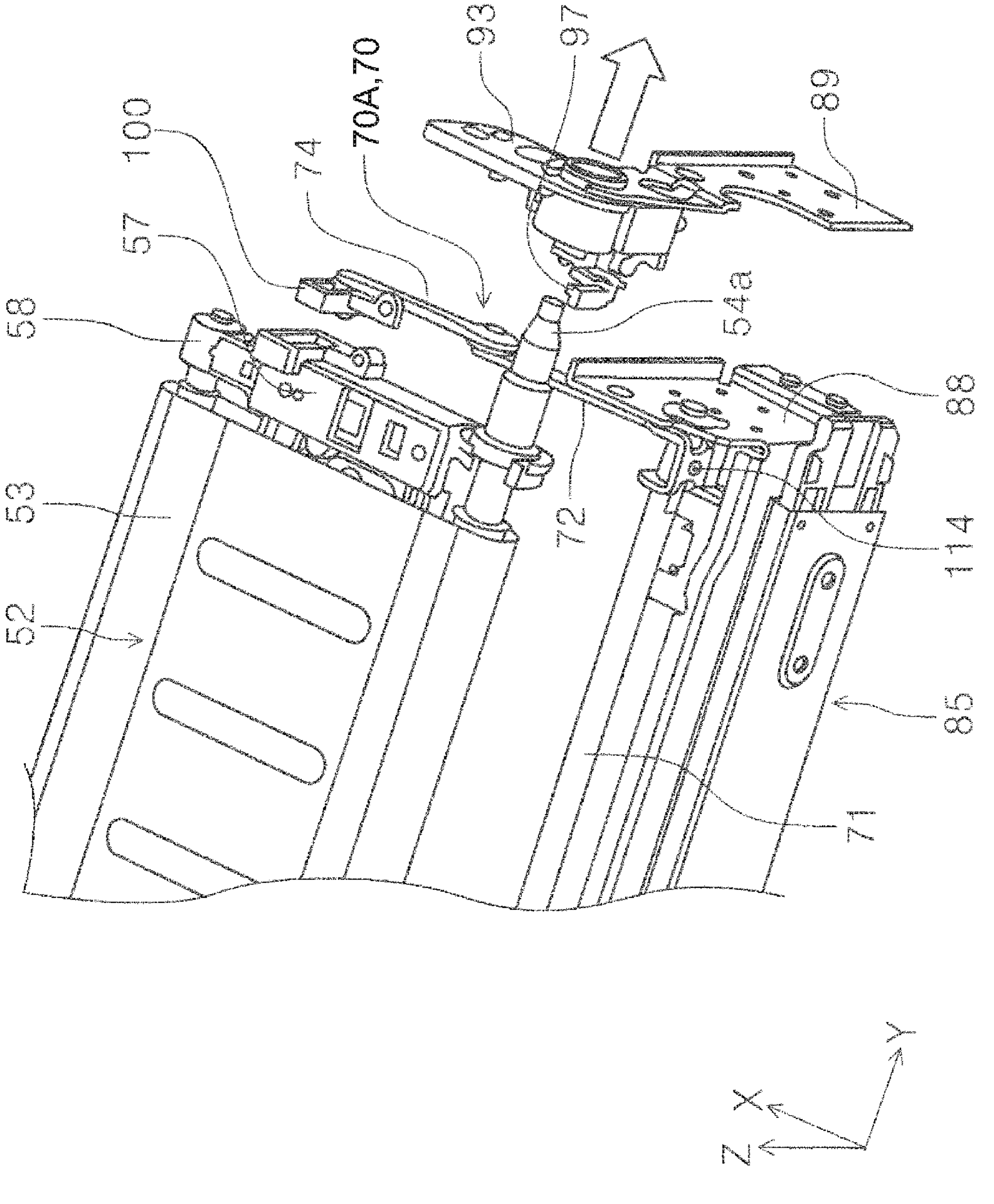
FIG. 11 is an exploded perspective view of the first support section.

At this stage, the support member 93 overlaps with the transport belt 53 as viewed from the Y-axis direction, and as shown in FIG. 10, the first frame 88 is positioned in the +Y direction with respect to the support member 93. Therefore, as an eighth procedure, the support member 93 is rotated in the direction of the arrow Ra in FIG. 10 to eliminate the overlap between the first frame 88 and the support member 93, and then as a ninth procedure, as shown in FIG. 11, the second frame 89, the support member 93, and the pressing member 97 are moved in the +Y direction.

Upon completion of the ninth procedure, since all obstacles when the transport belt 53 is pulled out in the +Y direction are gone, the transport belt 53 is pulled out in the +Y direction as shown in FIG. 12.

In order to restore the original state after the exchange of the transport belt 53, it is sufficient to follow a procedure opposite from the above.

In addition, each procedure described above may be appropriately exchanged within a range in which there is no problem in the operation. In addition, each procedure described above may be appropriately omitted. For example, when any of the support member 93, the pressing member 97, the pressing spring 98, the charging unit 83, and the first link mechanism 70A are not provided, the procedure related to the configuration that is not provided can be omitted.

As described above, the first support section 86 includes the first frame 88 and the second frame 89, which is a frame detachable from and attachable to the first frame 88 and which pivotably supports the belt unit 52, and the second frame 89 is positioned in the outward direction with respect to the first frame 88. More specifically, the "outward direction" is the direction in the Y-axis direction, that is, in the width direction, from the center of the transport belt 53 toward the first support section 86, and is the +Y direction. That is, the second frame 89 is positioned in the +Y direction, which is the outward direction, with respect to the first frame 88.

By this, the +Y direction, which is one end side of the transport belt 53 in the width direction, can be exposed by removing the second frame 89. As a result, the transport belt 53 can be removed in a state in which the belt unit 52 is supported by the second support section 87, that is, the transport belt 53 can be removed without removing the belt unit 52 from both the first support section 86 and the second support section 87, and thus the transport belt 53 can be more easily replaced.

Further, the transport unit 51 includes the first link mechanism 70A provided on the first support section 86 side in the width direction with respect to the belt unit 52, the second link mechanism 70B provided on the second support section 87 side in the width direction with respect to the belt unit 52, and the transmission shaft 71 that transmits power to the first link mechanism 70A and to the second link mechanism 70B. It has a configuration wherein rotation of the transmission shaft 71 is converted into pivoting of the belt unit 52 via the first link mechanism 70A and the second link mechanism 70B and, in a state in which the connection between the first link mechanism 70A and the belt unit 52 is released, the posture of the belt unit 52 is maintained by the second link mechanism 70B. As a result, the posture of the belt unit 52 is stabilized when the transport belt 53 is replaced, and workability when the transport belt 53 is replaced is improved.

In this embodiment, the posture maintenance of the belt unit 52 by the second link mechanism 70B is realized by the torque necessary to rotate the transmission shaft 71. For example, a rotational load in a power transmission mechanism that transmits power from a motor (not shown), which drives the transmission shaft 71, to the transmission shaft 71 contributes to maintaining the posture of the belt unit 52. Further, for example, in a configuration in which a worm gear (not shown) is provided on the motor (not shown), which drives the transmission shaft 71, and power is transmitted from the worm gear to a helical gear (not shown), it is difficult to rotate the worm gear from the helical gear side, and thus the configuration contributes to maintaining the posture of the belt unit 52.

The belt unit 52 includes the first roller 54 around which the transport belt 53 is wound, the second roller 55 around which the transport belt 53 is wound, the first member 57 that engages with the first roller 54, the second member 58 that engages with the second roller 55 and that is displaceable with respect to the first member 57 in the direction in which the inter-axis distance between the first roller 54 and the second roller 55 changes, the coil springs 61 that press the second member 58 in the direction in which the inter-axis distance increases, the third member 59 that receives the pressing force of the coil springs 61 and that is displaceable in the displacement direction of the second member 58, and the fourth member 60 that is detachable and attachable and that fixes the position of the third member 59 in the displacement direction. By removing the fourth member 60, the pressing force for pressing the second member 58 by the coil springs 61 weakens, and tension of the transport belt 53 weakens.

This improves the workability when the transport belt 53 is replaced.

The belt unit 52 includes the detachable and the attachable blade unit 63 that cleans the transport belt 53 by contact with the transport belt 53, and the fourth member 60 is provided integrally with respect to the blade unit 63. Accordingly, when the blade unit 63 is removed in order to remove the transport belt 53, the fourth member 60 is also removed, the pressing force of the coil springs 61 is weakened, and the tension of the transport belt 53 is weakened. This further improves the workability when the transport belt 53 is replaced.

As shown in FIG. 14, a guide surface 59*a* is formed on the third member 59, and a guide surface 60*a* is also formed on the fourth member 60. As a result, as the fourth member 60 is attached as indicated by the arrow a in FIG. 14, the third member 59 is guided in a direction in which the third member 59 advances toward the second member 58 (leftward in FIG. 14). That is, the third member 59 is automatically displaced in accordance with attaching the fourth member 60, and workability at the time of attaching the fourth member 60 is improved. In this embodiment, the guide surfaces are formed on both the third member 59 and the fourth member 60, but a guide surface may be formed on only one of them.

The drive unit 92, which is a drive source that drives the first roller 54, is provided in the second support section 87. Here, although it is necessary to release the link between the first roller 54 and the drive unit 92 in order to remove the belt unit 52 from the second support section 87, the belt unit 52 may remain supported by the second support section 87 when the transport belt 53 is replaced, and thus it is possible to avoid the drive unit 92 from becoming an obstacle to the replacement work of the transport belt 53.

The present disclosure is not limited to the embodiments described above, and various modifications can be made within the scope of the disclosure described in the claims, and it is needless to say that these are also included in the scope of the present disclosure.

What is claimed is:

1. A medium transport device comprising:

a belt unit that is a unit including (i) a transport belt for transporting a medium and that is pivotably supported on both sides in a width direction, which is a direction intersecting a medium transport direction, (ii) a first roller around which the transport belt is wound, (iii) a second roller around which the transport belt is wound, (iv) a first member that engages with the first roller, and (v) a second member that engages with the first member and that is displaceable with respect to the first member in a direction in which an inter-axis distance between the first roller and the second roller changes;

a first support section disposed on one side of the belt unit in the width direction and configured to pivotably support the belt unit;

a second support section disposed on an other side of the belt unit in the width direction and configured to pivotably support the belt unit;

a rotating section configured to support the belt unit with the first unit; and a first link mechanism provided on the first support section side in the width direction with respect to the belt unit and fixed to the first member, wherein the first support section includes a first frame and a second frame, the second frame being configured to detach from and attach to the first frame and being configured to pivotably support the belt unit, the first frame being configured to receive a transmission shaft operatively coupled to the belt unit, wherein rotation of the transmission shaft is converted into pivoting of the belt unit, the belt unit is switched between a first position in which the belt unit overlaps with the first frame as viewed from a rotation axis direction of the belt unit and a second position in which the belt unit does not overlap with the first frame as viewed from the rotation axis direction of the belt unit;

in the second position, as viewed from the rotation axis direction of the belt unit, the second frame overlaps with a part of the transport belt, a direction in the width direction from a center of the transport belt toward the first support section is an outer direction, the second frame is positioned farther from the center of the transport belt in the outer direction than the first frame, the first member, and the second member, and the rotating section is positioned in a direction opposite to the outer direction than the first frame, the transport belt is moved in an outward direction to be detached from the first roller and the second roller, when the transport belt is removed, the first link mechanism is released from fixation to the first member, the second frame and the first frame are released from the fixation, the rotating section is rotated to a position where it does not overlap with the first frame as viewed from the rotation axis, the second frame and the rotating member are removed from the first frame by being moved along the outer direction.

2. The medium transport device according to claim 1, further comprising:

a second link mechanism provided on the second support section side in the width direction with respect to the belt unit; and the transmission shaft that transmits power to the first link mechanism and the second link mechanism, wherein it has a configuration in which rotation of the transmission shaft is converted into pivoting of the belt unit via the first link mechanism and the second link mechanism and in a state where a connection between the first link mechanism and the belt unit is released, posture of the belt unit is maintained by the second link mechanism.

3. The medium transport device according to claim 2, wherein the belt unit includes a pressing member that presses the second member in a direction in which the inter-axis distance increases, a third member that receives pressing force of the pressing member and that is displaceable in a displacement direction of the second member, and a fourth member that is a detachable and attachable member and that fixes position of the third member in the displacement direction and by removing the fourth member, the pressing force with which the pressing member presses the second member is weakened.

4. The medium transport device according to claim 3, wherein the belt unit detachably and attachably includes a cleaning unit configured to clean the transport belt by contact with the transport belt and the fourth member is integrally provided with the cleaning unit.

5. The medium transport device according to claim 4, wherein at least one of the third member and the fourth member is provided with a guide surface that guides the third member in a direction in which the third member advances toward the second member as the fourth member is attached.

6. The medium transport device according to claim 3, wherein the second support section is provided with a drive source for driving the first roller.

7. A recording device comprising:

a recording section configured to perform recording on a medium and the medium transport device according to claim 1.

8. A medium transport device comprising:

a belt unit that is a unit including a transport belt for transporting a medium and that is pivotably supported on both sides in a width direction, which is a direction intersecting a medium transport direction;

a first support section disposed on one side of the belt unit in the width direction and configured to pivotably support the belt unit, the first support section includes a first frame and a second frame, the second frame being configured to detach from and attach to the first frame and being configured to pivotably support the belt unit, the first frame being configured to receive a transmission shaft operatively coupled to the belt unit, wherein rotation of the transmission shaft is converted into pivoting of the belt unit; and a second support section disposed on an other side of the belt unit in the width direction and configured to pivotably support the belt unit, wherein the belt unit includes a first roller around which the transport belt is wound, a second roller around which the transport belt is wound, a first member engaged with the first roller, a second member that engages with the second roller and that is displaceable with respect to the first member in a direction in which an inter-axis distance between the first roller and the second roller changes, a pressing member that presses the second member in a direction in which the inter-axis distance increases, a third member that receives pressing force of the pressing member and that is displaceable in a displacement direction of the second member, and a fourth member that is a detachable and attachable member and that fixes position of the third member in the displacement direction, the fourth member being removably attached to the first member at a location towards a drive shaft of the first roller to which power is transmitted to rotate the transport belt, and by removing the fourth member, the pressing force with which the pressing member presses the second member is weakened, and when the second frame is detached from the first frame, the transport belt is replaceable.

9. The medium transport device according to claim 8, wherein the belt unit detachably and attachably includes a cleaning unit configured to clean the transport belt by contact with the transport belt and the fourth member is integrally provided with the cleaning unit.

10. A medium transport device comprising:

a belt unit that is a unit including a transport belt for transporting a medium and that is pivotably supported on both sides in a width direction, which is a direction intersecting a medium transport direction, the transport belt being configured to be replaced;

a first support section disposed on one side of the belt unit in the width direction and configured to pivotably support the belt unit; and a second support section disposed on the other side of the belt unit in the width direction and configured to pivotably support the belt unit, wherein the first support section includes a first frame and a second frame, the second frame being configured to detach from and attach to the first frame and being configured to pivotably support the belt unit, the belt unit includes:

a first roller around which the transport belt is wound, a second roller around which the transport belt is wound, a first member engaged with the first roller, a second member that engages with the second roller and that is displaceable with respect to the first member in a direction in which an inter-axis distance between the first roller and the second roller changes, a pressing member that presses the second member in a direction in which the inter-axis distance increases, a third member that receives pressing force of the pressing member and that is displaceable in a displacement direction of the second member, and a fourth member that is a detachable and attachable member and that fixes a position of the third member in the displacement direction, the fourth member being removably attached to the first member at a location towards a drive shaft of the first roller to which power is transmitted to rotate the transport belt, the pressing force with which the pressing member presses the second member is weakened by removing the fourth member, the fourth member is provided integrally with respect to a blade unit, and when the second frame and the fourth member are detached from the first frame and the belt unit supports the second support section, the transport belt is configured to be pulled out from the belt unit in the direction of the inter-axis, and when a direction in the width direction from a center of the transport belt toward the first support section is an outer direction, the second frame is positioned farther from the center of the transport belt in the outer direction than the first frame, the first member, and the second member.

* * * * *